US012269595B2

(12) United States Patent
Moe et al.

(10) Patent No.: US 12,269,595 B2
(45) Date of Patent: Apr. 8, 2025

(54) WHEELCHAIR ACCESSIBLE AIRLINER LAVATORY

(71) Applicant: B/E AEROSPACE, INC., Winston Salem, NC (US)

(72) Inventors: Daniel N. Moe, Mukilteo, WA (US); Mark B. Dowty, Rural Hall, NC (US); Glenn A. Johnson, Rural Hall, NC (US); Shawn William Raybell, Maple Valley, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 44 days.

(21) Appl. No.: 18/315,205

(22) Filed: May 10, 2023

(65) Prior Publication Data

US 2024/0375775 A1 Nov. 14, 2024

(51) Int. Cl.
*B64D 11/02* (2006.01)
*B64D 11/06* (2006.01)
*B64D 11/00* (2006.01)

(52) U.S. Cl.
CPC ......... *B64D 11/02* (2013.01); *B64D 11/0691* (2014.12); *B64D 2011/0092* (2013.01)

(58) Field of Classification Search
CPC ............... B64D 11/02; B64D 11/0691; B64D 2011/0092; A61G 3/08; A61G 3/0816
See application file for complete search history.

(56) References Cited

U.S. PATENT DOCUMENTS

| 6,079,669 | A  | * | 6/2000  | Hanay ............... B64D 11/02 |
|           |    |   |         |              4/312              |
| 8,944,377 | B2 |   | 2/2015  | McIntosh                        |
| 9,708,062 | B2 | * | 7/2017  | Grant ............... B64D 11/02 |
| 10,106,259| B2 |   | 10/2018 | Seibt                           |
| 10,231,563| B2 | * | 3/2019  | Colacecchi ...... B64D 11/0023  |
| 11,299,272| B2 | * | 4/2022  | Seibt .............. B64D 11/02  |
| 11,542,007| B2 |   | 1/2023  | Waldheuer et al.                |
| 11,878,802| B2 | * | 1/2024  | Scoley ............. B64D 11/02  |
| 12,030,638| B2 | * | 7/2024  | Rodriguez-Conde .......          |
|           |    |   |         |              B64D 11/02         |

(Continued)

FOREIGN PATENT DOCUMENTS

| EP | 0867365 | 9/1998 |
| EP | 4023556 | 7/2022 |

OTHER PUBLICATIONS

European Patent Office, European Search Report dated Sep. 16, 2024 in Application No. 24174304.6.

*Primary Examiner* — Richard Green
(74) *Attorney, Agent, or Firm* — SNELL & WILMER L.L.P.

(57) ABSTRACT

An aircraft lavatory is disclosed herein. The aircraft lavatory includes a standard access door providing access to the aircraft lavatory from at least one of an aisle, a cross aisle, or a passageway of an aircraft, a first moveable wall adjacent the standard access door, the first moveable wall having a first end and a second end and configured to move between a closed position and an open position, the first end of the first moveable wall configured to rotate about a first pivot point, and a second moveable wall adjacent the first moveable wall, the second movable wall having a first end and a second end and configured to move between a closed position and an open position, the first end of the second moveable wall configured to rotate about a second pivot point.

20 Claims, 9 Drawing Sheets

(56) References Cited

U.S. PATENT DOCUMENTS

| | | | |
|---|---|---|---|
| 2013/0206907 A1* | 8/2013 | Burrows | B64D 11/02 244/118.5 |
| 2014/0291446 A1* | 10/2014 | Reams | B64D 11/02 244/118.5 |
| 2016/0039522 A1 | 2/2016 | Koyama et al. | |
| 2016/0069122 A1 | 3/2016 | Tubbs | |
| 2020/0269982 A1* | 8/2020 | Harrois | B64D 11/04 |
| 2022/0177136 A1* | 6/2022 | McIntosh | B64D 11/02 |
| 2022/0306297 A1 | 9/2022 | Clucas et al. | |

* cited by examiner

WHEELCHAIR ACCESSIBLE AIRLINER LAVATORY

FIELD

The present disclosure generally relates aircraft lavatories, and more particularly, to aircraft lavatory access for persons with reduced mobility.

BACKGROUND

A lavatory complex installed in an aircraft may be located against an outboard wall portion of an aircraft passenger cabin as well as the rear of the aircraft abutting the pressure dome. For ease of manufacture and ease of installation adjacent other interior structures, aircraft lavatories typically have flat walls on all sides facing the aircraft interior as defined by the lavatory envelope. Aircraft lavatories are typically located adjacent a doorway emergency exit path, such as abutting the cockpit bulkhead.

To provide a space for a crew member to stand by an emergency exit door for the purpose assisting passengers during an emergency evacuation of an aircraft, airworthiness authorities require that a 12-inch (30.48 centimeters) by 20-inch (50.8 centimeters) "assist space" be provided adjacent the aircraft exit doorway, alongside the exit path but outside the exit path itself. Attendant seats, occupied by flight attendants during takeoff, landing and at other times are typically mounted inboard of the assist spaces near the exit paths. The attendant seats most typically fold upward to a stowed position when not occupied so as to remain clear of the exit path.

A variety of techniques have been employed for transferring a mobility-impaired passenger between an aisle wheelchair and a toilet. A 90° transfer in which the aisle wheelchair is positioned at a 90° angle to the toilet and an assistant lifts the mobility-impaired passenger and rotates the passenger onto the toilet, and vice versa, has been found to reduce the risk of injury to the assistant and is, therefore, a favored method for assisted transfers. A lateral transfer, in which a mobility-impaired passenger slides sideways from wheelchair to toilet and vice versa can be favored for an unassisted transfer in which the mobility-impaired passenger prefers to make the transfer unaided and has the upper body strength to do so.

Existing lavatory solutions for persons with reduced mobility (PRM) include a wall at a centerline of the lavatory complex on a twin aisle aircraft, and a dedicated aft lavatory or galley complex on a narrow body aircraft. PRM lavatories, located against the outboard wall portion of the aircraft, are typically single oversized units which occupy an enlarged footprint in the aircraft cabin.

SUMMARY

Disclosed herein is an aircraft lavatory. The aircraft lavatory includes a standard access door providing access to the aircraft lavatory from at least one of an aisle, a cross aisle, or a passageway of an aircraft, a first moveable wall adjacent the standard access door, the first moveable wall having a first end and a second end and configured to move between a closed position and an open position, the first end of the first moveable wall configured to rotate about a first pivot point, and a second moveable wall adjacent the first moveable wall, the second movable wall having a first end and a second end and configured to move between a closed position and an open position, the first end of the second moveable wall configured to rotate about a second pivot point.

In various embodiments, the first moveable wall is configured to rotate at least 45° about the first pivot point from the closed position to the open position. In various embodiments, the second moveable wall is configured to rotate at least 80° about the second pivot point from the closed position to the open position. In various embodiments, the aircraft lavatory further includes a latch configured to secure the second end of the first moveable wall is configured to the second end of the second moveable wall when in the first moveable wall and the second moveable wall are in the closed position.

In various embodiments, the first moveable wall includes a first portion extending in a first direction coupled to a second portion extending in a second direction orthogonal to the first direction. In various embodiments, the aircraft lavatory further includes a first cabin attendant seat coupled to the first moveable wall and a second cabin attendant seat coupled to the second moveable wall. In various embodiments, the aircraft lavatory further includes a post configured to secure the standard access door in a closed position, wherein the first end of the first moveable wall is coupled to the post, the post being the first pivot point.

In various embodiments, the aircraft lavatory further includes a first fixed wall having a first side and a second side and extending the in a first direction, a second fixed wall having a first side and a second side, the first side of the second fixed wall coupled to the first side of the first fixed wall, the second fixed wall extending in a second direction that is orthogonal to the first direction, wherein the standard access door is coupled to the second fixed wall, and a third fixed wall having a first side and a second side, the first side of the third fixed wall coupled to the second side of the first fixed wall, the third fixed wall extending in the second direction, wherein the second moveable wall is coupled to the second side of the third fixed wall. In various embodiments, the aircraft lavatory is configured to receive a mobility device through an opening that is defined by the first moveable wall and the second moveable wall being in the open position.

Also disclosed herein is an aircraft including at least one lavatory. The at least one lavatory includes a standard access door providing standard access to the at least one lavatory from an aisle, a cross aisle, or a passageway of the aircraft, a first moveable wall adjacent the standard access door, the first moveable wall having a first end and a second end and configured to move between a closed position and an open position, the first end of the first moveable wall configured to rotate about a first pivot point, and a second moveable wall adjacent the first moveable wall, the second moveable wall having a first end and a second end and configured to move between a closed position and an open position, the first end of the second moveable wall configured to rotate about a second pivot point.

In various embodiments, the first moveable wall is configured to rotate at least 45° about the first pivot point from the closed position to the open position. In various embodiments, the second moveable wall is configured to rotate at least 80° about the second pivot point from the closed position to the open position. In various embodiments, the aircraft further includes a latch configured to secure the second end of the first moveable wall is configured to the second end of the second moveable wall when in the first moveable wall and the second moveable wall are in the closed position. In various embodiments, the first moveable wall includes a first portion extending in a first direction coupled to a second portion extending in a second direction orthogonal to the first direction. In various embodiments, the aircraft further includes a first cabin attendant seat coupled to the first moveable wall and a second cabin attendant seat coupled to the second moveable wall. In various embodiments, wherein the at least one lavatory further includes a post configured to secure the standard access door in a closed position, wherein the first end of the first moveable wall is coupled to the post, the post being the first pivot point.

In various embodiments, the aircraft further includes a first aisle adjacent the at least one lavatory and a first curtain configured to extend across the first aisle, the first curtain providing privacy for the at least one lavatory. In various embodiments, the aircraft further includes a second aisle adjacent the at least one lavatory and a second curtain configured to extend across the second aisle, the second curtain providing privacy for the at least one lavatory.

In various embodiments, the at least one lavatory further includes a first fixed wall having a first side and a second side and extending the in a first direction, a second fixed wall having a first side and a second side, the first side of the second fixed wall coupled to the first side of the first fixed wall, the second fixed wall extending in a second direction that is orthogonal to the first direction, wherein the standard access door is coupled to the second fixed wall, and a third fixed wall having a first side and a second side, the first side of the third fixed wall coupled to the second side of the first fixed wall, the third fixed wall extending in the second direction, wherein the second moveable wall is coupled to the second side of the third fixed wall. In various embodiments, the at least one lavatory is configured to receive a mobility device through an opening defined by the first moveable wall and the second moveable wall being in the open position.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Commercial aircraft are beginning to include wheelchair spots that can be occupied by a person with reduced mobility (PRM) in a power wheelchair with the wheelchair restrained to the floor. This allows the PRM passenger to board and deboard the aircraft in the comfort of their own wheelchair as outfitted to suit their physical needs. The use of these wheelchair spots introduces an issue with using the lavatory on the aircraft as wheelchairs do not generally fit down the aisles of the aircraft or in the lavatories of the aircraft.

Disclosed herein is a PRM lavatory for use by PRM passengers. In various embodiments, the PRM lavatory may accommodate passengers using standard size wheelchairs, large wheelchairs, and powered wheelchairs that do not fit through the doorway of conventional aircraft lavatories. In various embodiments, the PRM lavatory may occupy the same footprint as existing aircraft lavatories. In various embodiments, the PRM lavatory includes an outer wall that opens and folds out the way, allowing access for PRM passengers in a wheelchair. In various embodiments, one or more cabin attendant seats, or jump seats, may be secured to the exterior of the outer wall (e.g., outside the PRM lavatory) for use by cabin attendants during taxi, takeoff, and landing. In various embodiments, privacy curtains may be installed in the aircraft to provide privacy to the PRM passenger using the PRM lavatory. In various embodiments, the PRM lavatory may include additional space for an assistant or attendant to assist the PRM passenger with using the PRM lavatory.

The PRM lavatory disclosed herein may benefit the PRM passengers by reducing strain on their body, mind, and internal organs (including skin, skeletal, spinal, neurologic, cardio-pulmonary, mental, and forced dehydration issues, among others). Airline adopters will benefit from installing the PRM lavatory by being compliant with new rulemaking, public relations, accessibility standards, goodwill, and market expansion.

Figure 1:
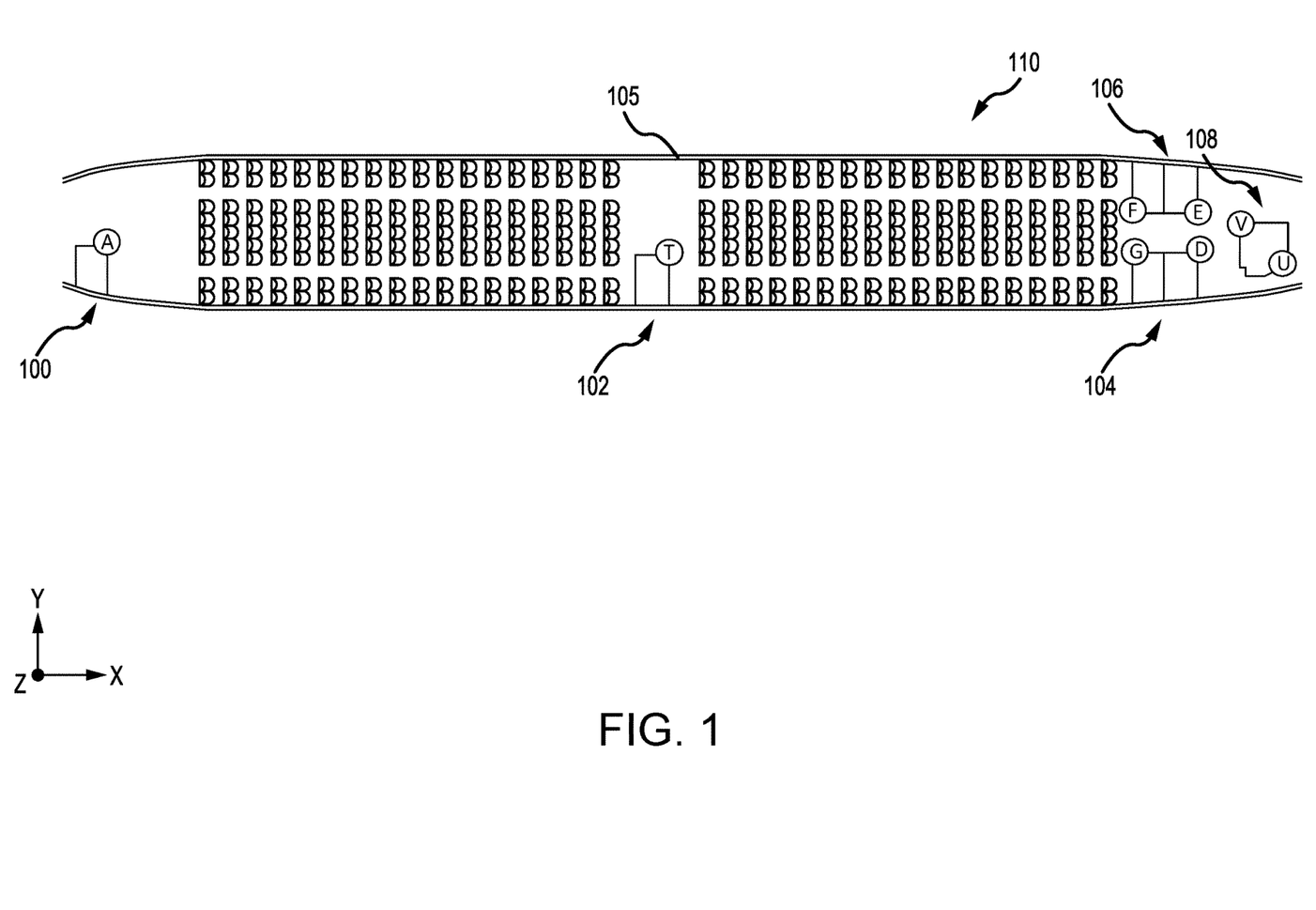
FIG. 1 illustrates a partial top view of an aircraft cabin with exemplary lavatory monuments, in accordance with various embodiments.

Referring now to FIG. 1, a partial top view of an aircraft cabin with exemplary lavatory monuments is illustrated, in accordance with various embodiments. As illustrated in FIG. 1, numerous lavatory monuments 100, 102, 104, 106, and 108 are shown with certain lavatory monuments located along an outboard wall 105 of the aircraft cabin. Lavatory monument 100 is located approximately toward the front of the aircraft (e.g., in the negative x-direction), lavatory monument 102 is located approximately in the middle of the fuselage (e.g., near a wing), and lavatory monuments 104, 106, 108 are located toward the rear of an aircraft 110. The outboard wall 105 may be formed as a curved body of the fuselage of aircraft 110.

Lavatory monument 100 is configured to provide PRM access to a lavatory including the use of a person with reduced mobility (PRM) mobility device, such as a wheelchair, electric wheelchair, or scooter, among others, entering lavatory monument 100. In various embodiments, an outer wall of lavatory monument 100 is reconfigured to open so that the PRM mobility device may enter lavatory monument 100. In that regard, the PRM passenger may enter lavatory monument 100 and transfer from the PRM mobility device to a toilet within lavatory monument 100 with minimal assistance.

Lavatory monuments 102, 104, 106, 108 may be configured similar to lavatory monument 100 such that an outer wall is configured to open and allow entry of the PRM passenger on the PRM mobility deice. In the various embodiments, an area between the lavatory monuments 104, 106, 108 is an open area with sufficient space for maneuvering a PRM mobility device, for example, a wheelchair. Note that the drawing is not necessarily shown to scale and is merely illustrative of one possible configuration of lavatory monuments 100, 102, 104, 106, 108 in a cabin of aircraft 110. Configuration of the aisle, cross aisle, passageway, and seats may be in any suitable arrangement that permits ingress and egress through either of the two doors provided in lavatory monuments 104, 106, 108. In various embodiments, lavatory monuments may be located in an aft portion of the aircraft (e.g., in the positive x-direction and/or near the pressure dome), or in a forward portion of the aircraft (e.g., in the negative x-direction and immediately aft of the cockpit).

In various embodiments, lavatory monuments 104, 106, 108, for example, may be designed for lateral installation, with the closed doors of lavatory monuments 104, 106, 108 facing forward or aft, depending on configuration in the fuselage. In various embodiments, the lavatory compartment doors (in the closed position) may be oriented to be parallel to an aisle, cross aisle, or passageway, such as the center aisle that runs longitudinally from front to aft in a commercial aircraft.

Figure 2A:
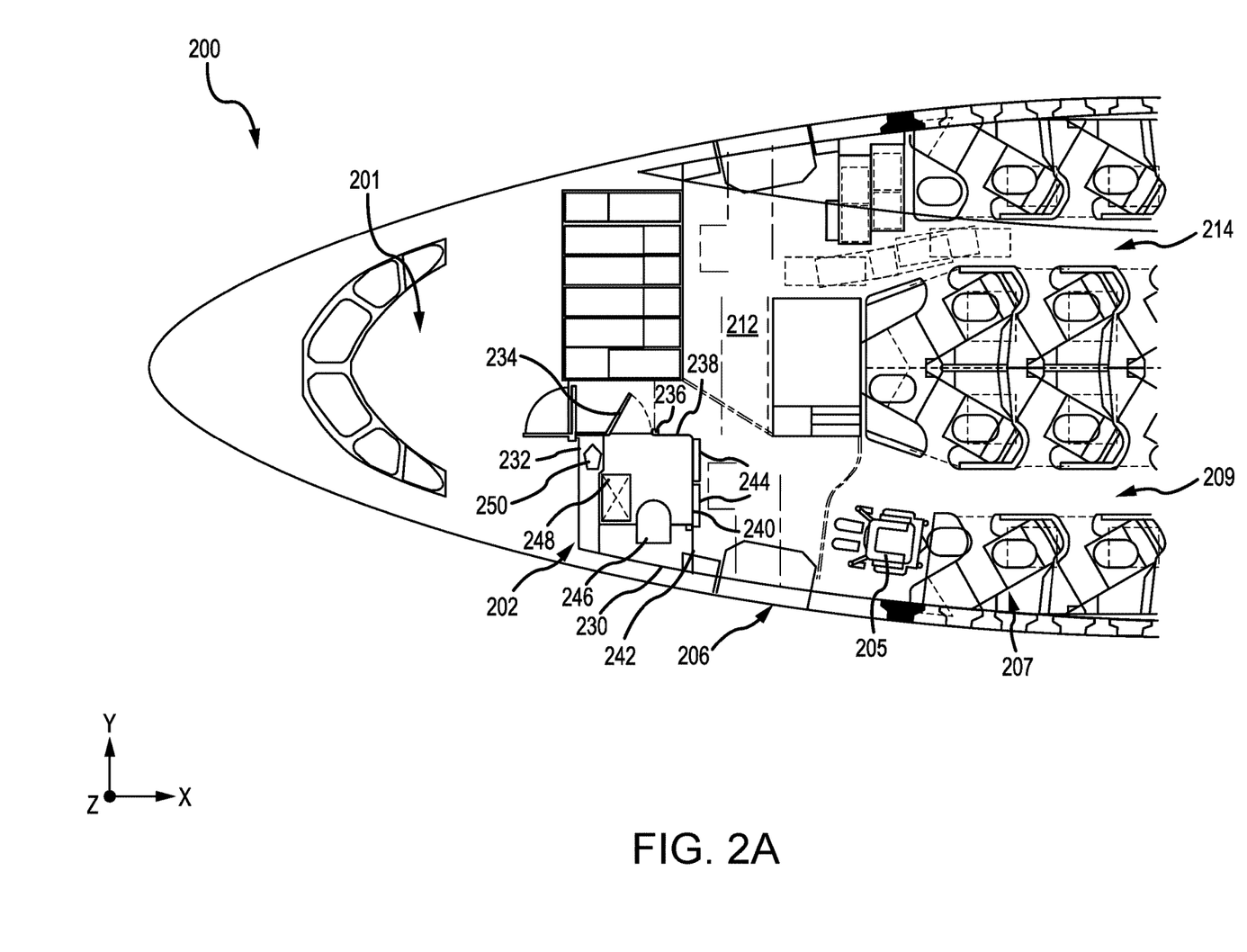
FIGS. 2A, 2B, and 2C illustrate top down views of a lavatory in an aircraft, in accordance with various embodiments.
Figure 2B:
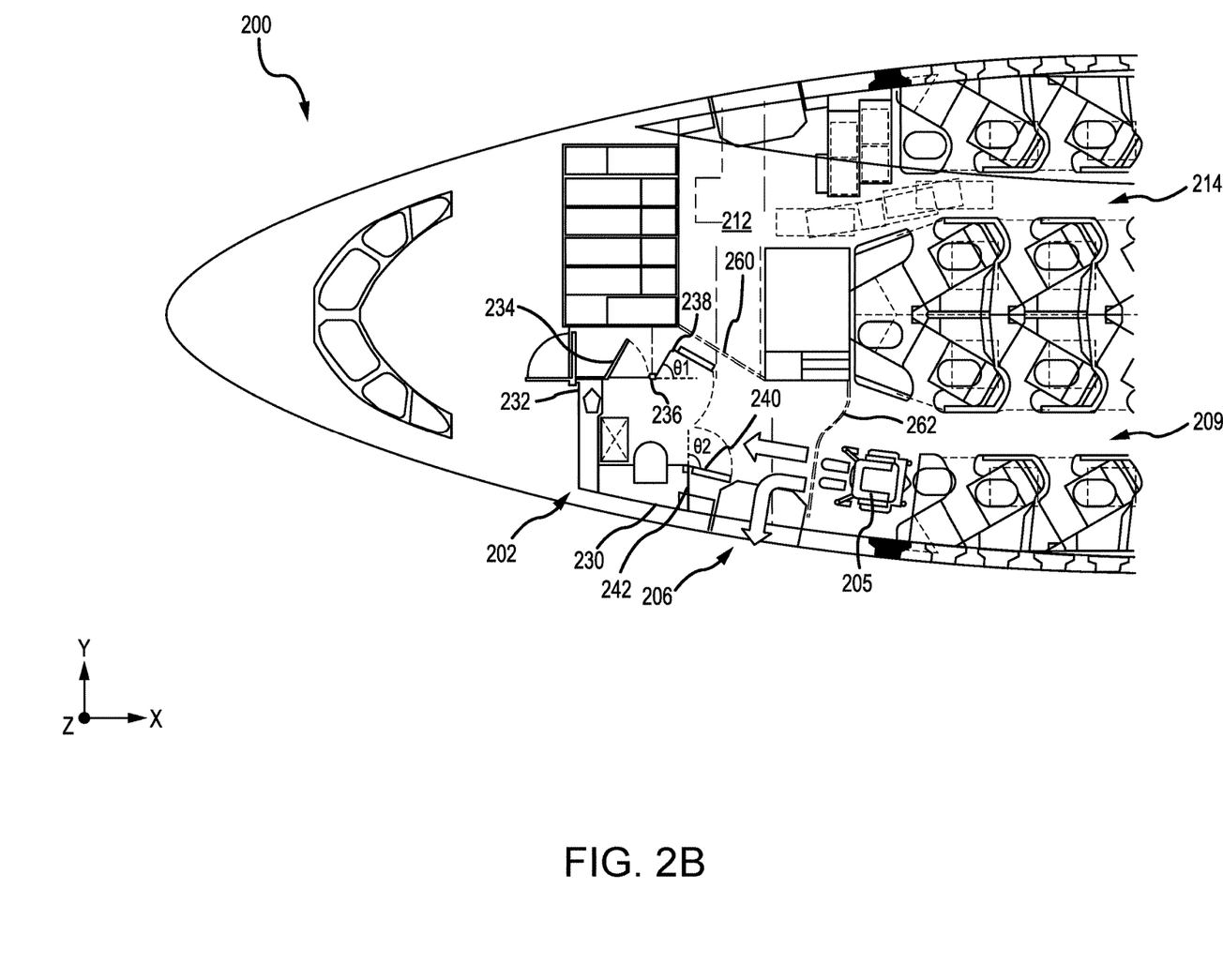
Figure 2C:
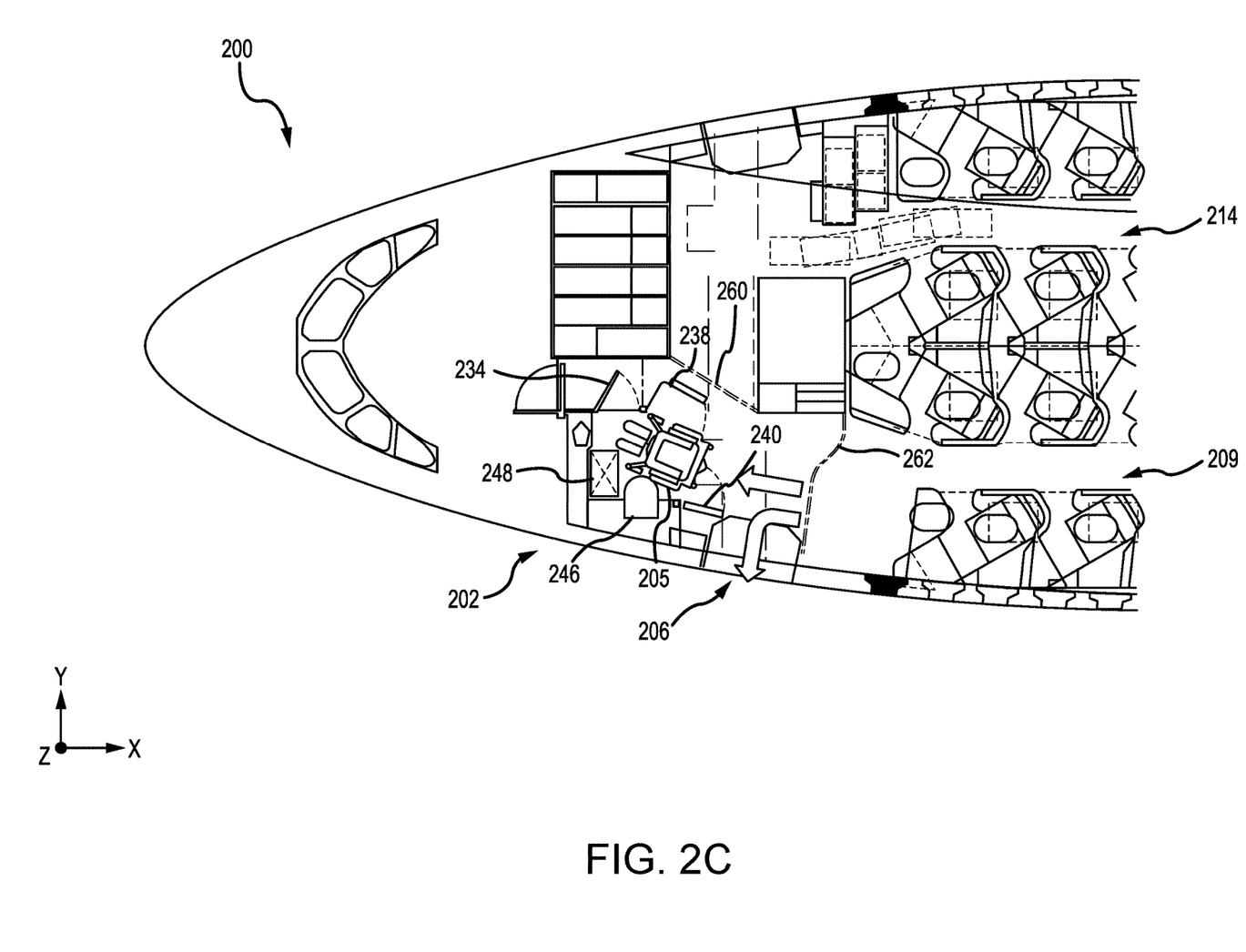

Referring now to FIGS. 2A-2C, an aircraft 200 including a person with reduced mobility (PRM) lavatory 202 is illustrated, in accordance with various embodiments. PRM lavatory 202 is illustrated in FIG. 2A-2C as being in a forward portion of aircraft 200 (e.g., in the negative x-direction). In various embodiments, PRM lavatory 202 may be an example of lavatory monument 100 in FIG. 1. In various embodiments, PRM lavatory 202 may be an example of lavatory monuments 104, 106, 108. For ease of description, PRM lavatory 202 will be described as being located in the forward portion of aircraft 200 as illustrated in FIGS. 2A-2C.

Aircraft 200 includes a cockpit 201, PRM lavatory 202, a PRM mobility device 205, an exit door 206, a front row seat 207, a galley aisle 212, and passenger aisles 209, 214. Generally, passenger aisles 209, 214 are not wide enough for a standard PRM mobility device 205 and a custom, smaller PRM mobility device may be used to transport PRM passenger down passenger aisles 209, 214.

PRM lavatory 202 includes a first fixed wall 230, a second fixed wall 232, a standard access door 234, a post 236, a first moveable wall 238, a second moveable wall 240, a third fixed wall 242, a toilet 246, a space 248, and a sink 250. In various embodiments, cabin attendant seats 244, or jump seats, may be mounted to first moveable wall 238 and/or second moveable wall 240. First moveable wall 238 and second moveable wall 240 may each be reinforced to support cabin attendant seats 244 and occupants for use loads (e.g., 16 G forward load). In various embodiments, third fixed wall 242, post 236, hinges, and/or latches may additionally be reinforced to support cabin attendant seats 244 and occupants for use loads. In various embodiments, PRM lavatory 202 may be installed into aircraft 200 as a single unit. In various embodiments, toilet 246 may include a shroud that is optimized for wheel clearance allowing PRM mobility device 205 to be as close as possible to toilet 246. In various embodiments, sink 250 may be partially open underneath to allow room for foot riggings that are commonly found on PRM mobility device 205.

As illustrated in FIGS. 2A-2C, first fixed wall 230 is adjacent an exterior wall of aircraft 200, second fixed wall is adjacent cockpit 201, and third fixed wall 242 is adjacent exit door 206. It will be appreciated that PRM lavatory 202 may be installed having different configurations and that the embodiment illustrated in FIGS. 2A-2C is not intended to be limiting but is for discussion purposes.

Standard access door 234 includes a fixed wall portion connected to second fixed wall 232 and adjacent a door to cockpit 201. Standard access door 234 is configured to open and close into an aisle outside the door of cockpit 201. Post 236 is configured to receive standard access door 234 so that standard access door 234 may be latched during use. Thus, PRM lavatory 202 is intended to be used by all passengers with the passengers using standard access door 234 to enter and exit PRM lavatory 202.

First moveable wall 238 is configured to mount to post 236 and to pivot about post 236 to move from a closed position to an open position. First moveable wall 238 includes a first portion and a second portion. When in the closed position as illustrated in FIG. 2A, the first portion of first moveable wall 238 extends from post 236 (e.g., in the positive x-direction) and the second portion of first moveable wall 238 extends orthogonally to the first portion (e.g., in the negative y-direction). The first portion and the second portion form a right angle and define a corner of PRM lavatory 202. In various embodiments, the corner may be rounded. First moveable wall 238 is secured to PRM lavatory 202 and aircraft 200 by one or more latches so that first moveable wall 238 is structurally solid for taxi, takeoff, and landing. In various embodiments, the latches may be 16G latches, 20G latches, or the like. That is, latches that are rated to withstand 16 g-forces or 20 g-forces. In various embodiments, cabin attendant seat 244 is mounted to the second portion. In various embodiments, first moveable wall 238 may be manufactured from a honeycomb panel or other lightweight material or a hybrid thereof.

Second moveable wall 240 is configured to mount to third fixed wall 242 and pivot about third fixed wall 240 from a closed position to an open position. In the closed position as illustrated in FIG. 2A, second moveable wall 240 extends in line with third fixed wall 242 (e.g., in the positive y-direction) and is configured to be coupled to first moveable wall 238. Second moveable wall 240 is secured to PRM lavatory 202 and aircraft 200 by one or more latches so that second moveable wall 240 is structurally solid for taxi, takeoff, and landing. In various embodiments, the latches may be 16G latches, 20G latches, or the like. In various embodiments, cabin attendant seat 244 is mounted to the second moveable wall 240. In the closed position, PRM lavatory 202 is able to withstand flex loads, abuse loads (e.g., 300 lbs. force), and taxi, takeoff, and landing loads.

Referring to FIG. 2B, first moveable wall 238 and second moveable wall 240 are pivoted to the open position. In various embodiments, this may include folding, or stowing, cabin attendant seat 244 and unlatching first moveable wall 238 and second moveable wall 240. First moveable wall 238 may be rotated a first angle θ1 about post 236 to open up a corner of PRM lavatory 202. In various embodiments, first angle θ1 may be about 45° to about 80°. Second moveable wall 240 may be rotated a second angle θ2 to open a side of PRM lavatory 202. In various embodiments, second angle θ2 may be about 90° to about 110°. Standard access door 234 may be opened or closed when moveable walls 238, 240 are in the open position. Furthermore, when in the open position, PRM lavatory 202 maintains its structural integrity with first fixed wall 230, second fixed wall 232, post 236, and third fixed wall 242 providing a load path for PRM lavatory 202. That is, PRM lavatory 202 is able to maintain its structural integrity when first moveable wall 238 and second removable wall 240 are moved to the open position and removed from the load path of PRM lavatory 202. Structural integrity of PRM lavatory 202 may be defined as being able to handle the loads exerted on PRM lavatory 202 during flight.

Aircraft 200 further includes a first curtain 260 and a second curtain 262 to be used in conjunction with PRM lavatory 202. First curtain 260 and second curtain 262 are configured to be stored, extended, and/or secured during use. As illustrated in FIGS. 2B and 2C, first curtain 260 is configured to extend across galley aisle 212 and second curtain 262 is configured to extend across passenger aisle 209 to provide privacy for the PRM passenger during use of PRM lavatory 202. In various embodiments, first curtain 260 and/or second curtain 262 may be placed in different configurations to provide privacy for the PRM passenger. In various embodiments, first curtain 260 and second curtain 262 may be operated independently of one another. In various embodiments, there may be more than two curtains.

With first moveable wall 238 and second moveable wall 240 in the open position, PRM mobility device 205 including the PRM passenger is able to enter directly into PRM lavatory 202 (as illustrated in FIG. 2C). In various embodiments, such as larger PRM lavatories 202, space 248 may provide room for an assistant or attendant to aid the PRM passenger in moving from PRM mobility device 205 to toilet 246. As illustrated in FIG. 2C, standard access door 234 may remain in the open position while PRM lavatory 202 is in use. In various embodiments, standard access door 234 may be moved to the closed position while PRM lavatory 202 is in use.

In various embodiments, first moveable wall 238 and/or second moveable wall 240 may be secured in the open, or a partially open, position using a detent, a latch, a hook, a rope, a cable, or a stop, among others. In various embodiments, first moveable wall 238 and/or second moveable wall 240 may be secured in the open, or a partially open, position by locking the pivot point using a lock, a pin, a bolt, or other means.

Figure 3A:
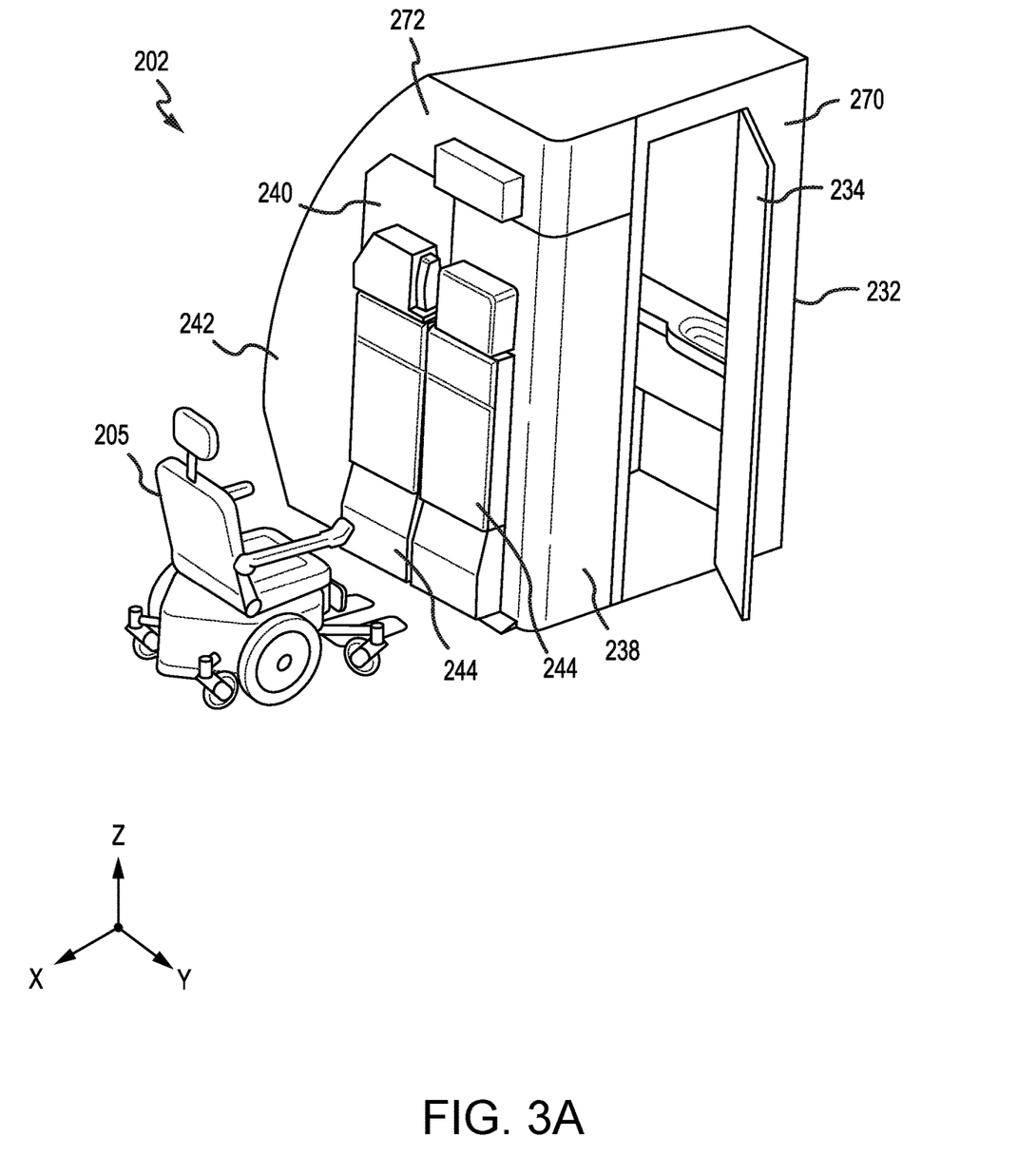
FIGS. 3A, 3B, 3C, and 3D illustrate perspective views of a lavatory in an aircraft, in accordance with various embodiments.
Figure 3B:
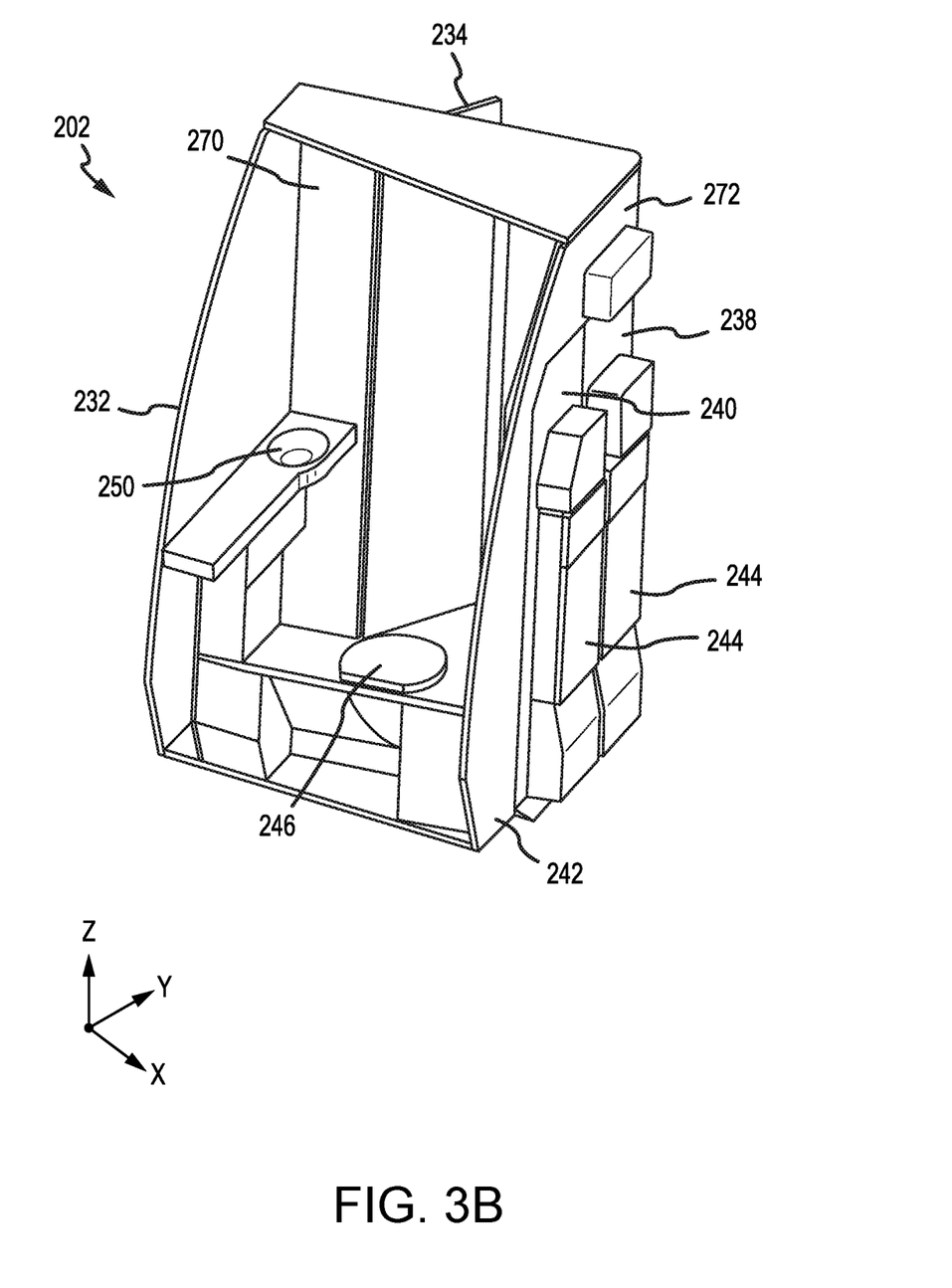
Figure 3C:
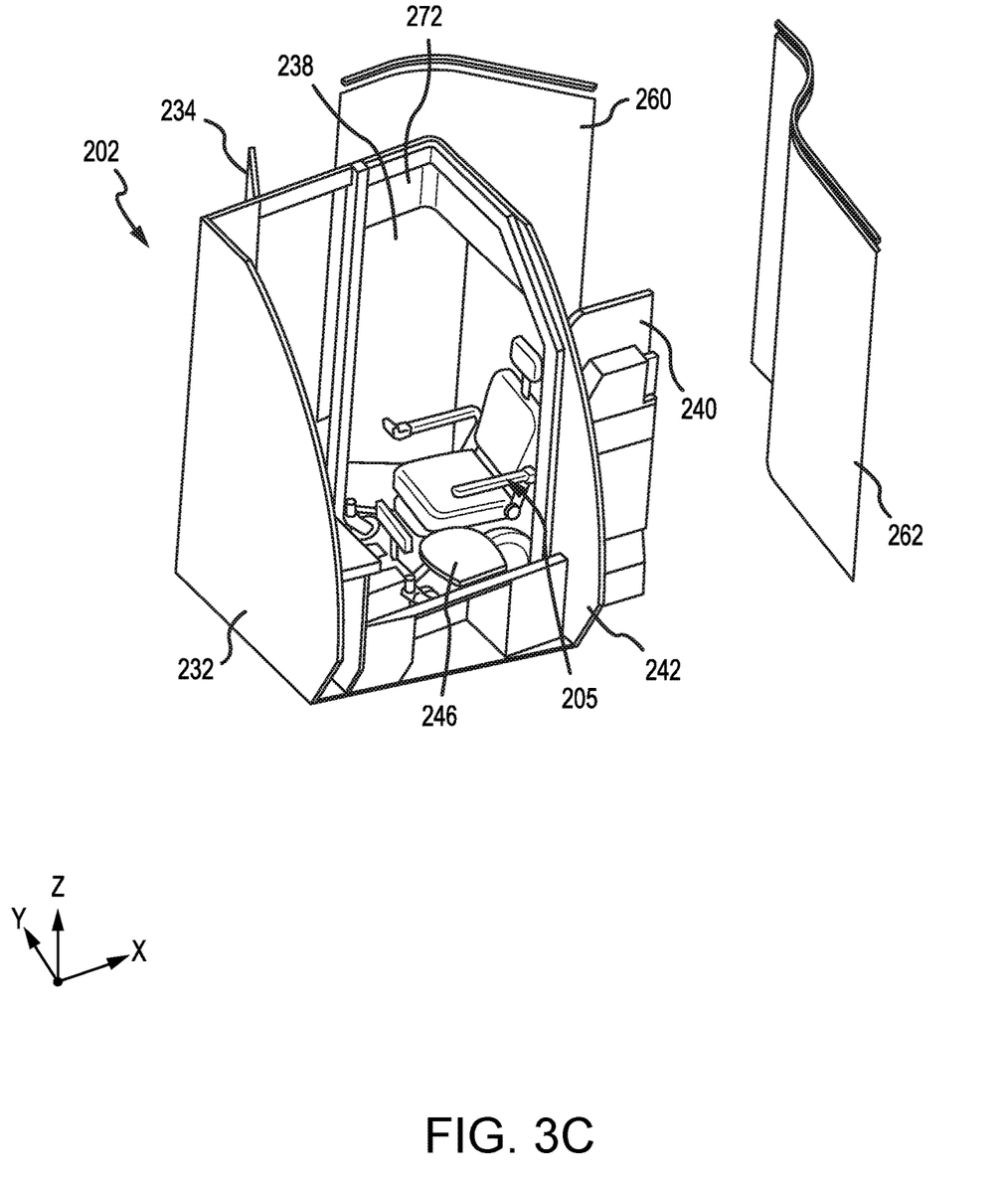
Figure 3D:
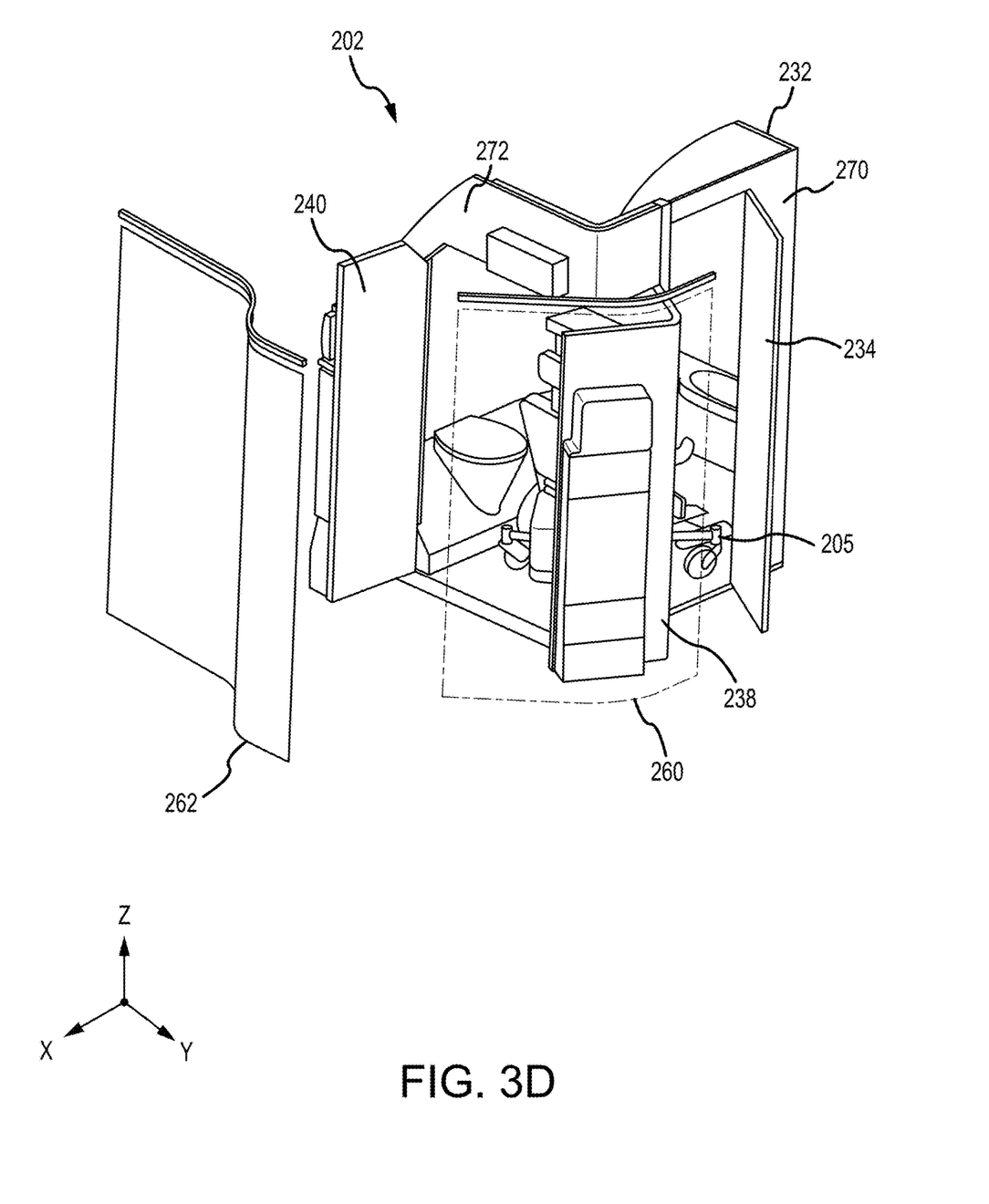

Referring now to FIGS. 3A-3D, illustrated are perspective views of PRM lavatory 202, in accordance with various embodiments. FIG. 3A illustrates a perspective view of PRM lavatory 202 with standard access door 234 in the open position and first moveable wall 238 and second moveable wall 240 in the closed position. FIG. 3B illustrates a perspective view of PRM lavatory 202 with first fixed wall 230 removed, standard access door 234 in the open position and first moveable wall 238 and second moveable wall 240 in the closed position. FIGS. 3C and 3D illustrate a perspective views of PRM lavatory 202 with first curtain 260 and second curtain 262 illustrated, first fixed wall 230 removed, and standard access door 234, first moveable wall 238, and second moveable wall 240 in the open position. PRM lavatory 202 further includes fixed wall portion 270 adjacent standard access door 234 and a header portion 272 above first moveable wall 238 and second moveable wall 240. Fixed wall portion 270 and header portion 272 provide further structural and safety support for PRM lavatory 202 when standard access door 234, first moveable wall 238, and/or second moveable wall 240 are in the open position. In various embodiments, header portion 270 may be coupled to the body of aircraft 110 and/or anchor points that are coupled to the body of aircraft 110.

In various embodiments, and as illustrated in FIGS. 3A-3D, second fixed wall 232 and third fixed wall 242 may be curved to match the body of aircraft 110. In various embodiments, first moveable wall 238, second moveable wall 240, and standard access door 234 may be taller or shorter than depicted. In various embodiments, standard access door 234 may be taller than first moveable wall 238 and/or second moveable wall 240.

Figure 4:
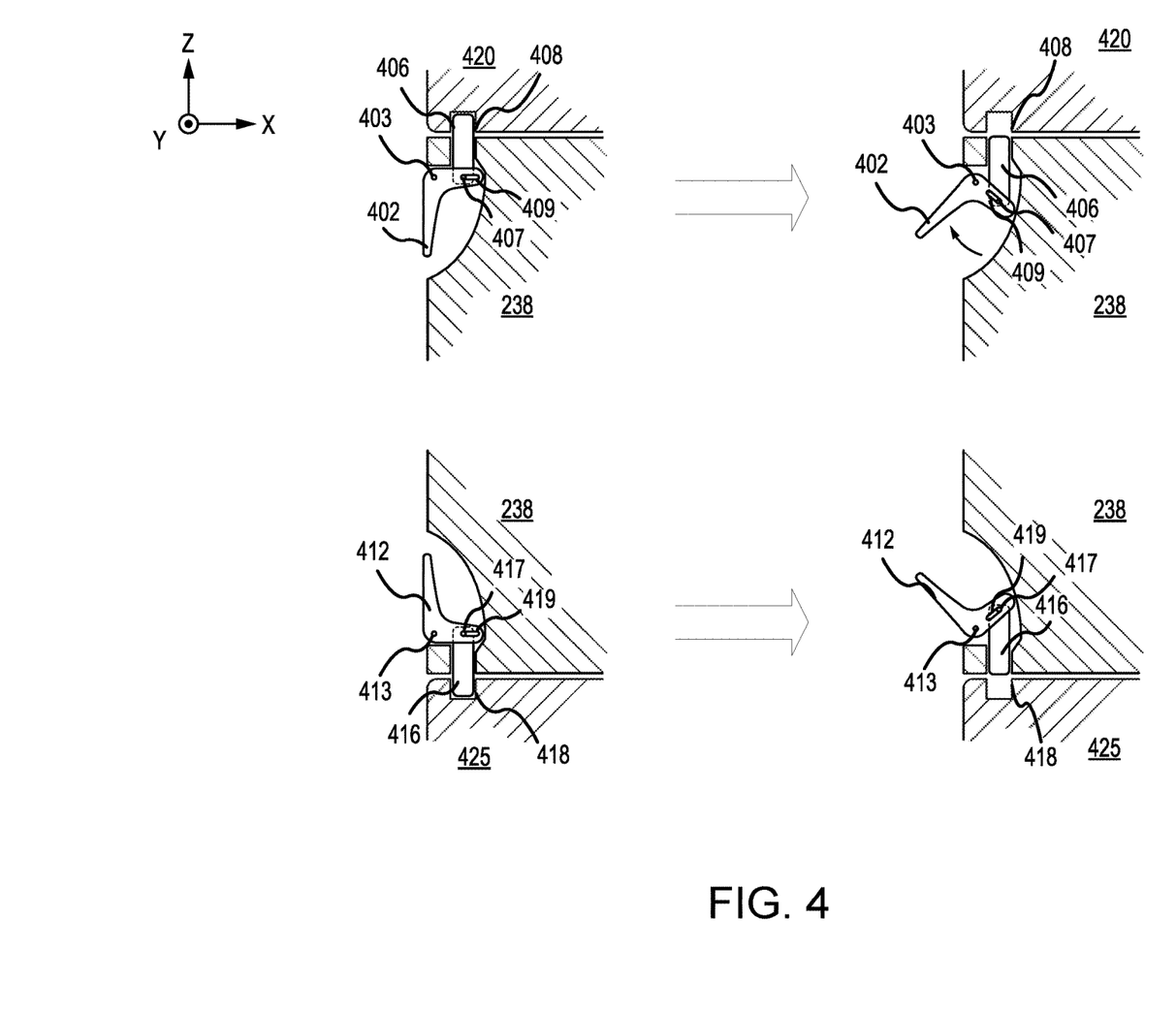
FIG. 4 illustrates latching mechanisms on a movable wall of a lavatory monument, in accordance with various embodiments.

Referring now to FIG. 4, illustrated are latching mechanisms for use with PRM lavatory 202 including first moveable wall 238 and/or second moveable wall 240, in accordance with various embodiments. In various embodiments, handle 402 includes a first portion that extends in a first direction (e.g., in the negative z-direction), and a second portion that extends in a second direction (e.g., in the positive x-direction), that is perpendicular to the first portion. In various embodiments, handle 402 is pivotably coupled to first moveable wall 238 via shaft 403 that extends laterally (e.g., along the y-axis). In various embodiments, pin 406 is pivotably coupled to handle 402 via shaft 407 that extends laterally (e.g., in the positive y-direction). In various embodiments, shaft 407 traverses a slot 409 incorporated into the second portion of the handle 402 and extends along a length of the handle 402 in the first direction. In various embodiments, in a locked position, pin 406 is forced upward (e.g., in the positive z-direction), such that pin 406 engages with a slot 408 in the ceiling 420 of the aircraft. In various embodiments, to move to an unlocked position, handle 402 is rotated about shaft 403 in a clockwise direction, which causes shaft 407 to traverse slot 409 in the first direction, thereby forcing the pin 406 downward (e.g., in the negative z-direction), such that pin 406 disengages with a slot 408 in the ceiling 420 of the aircraft.

In various embodiments, handle 412, which may be part of a latching mechanism used by first moveable wall 238 and/or second moveable wall 240, includes a first portion that extends in a first direction (e.g., in the positive z-direction), and a second portion that extends in a second direction (e.g., in the positive x-direction), that is perpendicular to the first portion. In various embodiments, handle 412 is pivotably coupled to a panel of a wall (e.g., first moveable wall 238 and/or second moveable wall 240) via shaft 413 that extends laterally (e.g., along the y-axis). In various embodiments, pin 416 is pivotably coupled to handle 412 via shaft 417 that extends laterally (e.g., along the y-axis). In various embodiments, shaft 417 traverses a slot 419 incorporated into the second portion of the handle 412 and extends along a length of the handle 412 in the first direction. In various embodiments, in a locked position, pin 416 is forced downward (e.g., in the negative z-direction), such that pin 416 engages with a slot 418 in the floor 425 of the aircraft. In various embodiments, to move to an unlocked position, handle 412 is rotated about shaft 413 in a counterclockwise direction, which causes shaft 417 to traverse slot 419 in the first direction thereby forcing the pin 416 upward (e.g., in the positive z-direction), such that pin 416 disengages with a slot 418 in the floor 425 of the aircraft.

It will be appreciated various different latching mechanisms may be used to secure first moveable wall 238 and/or second moveable wall 240 in the open position, the partially open position, and the closed position. The latch mechanism described above is used for illustrative and discussion purposes and is not intended to limit the scope of this disclose. Other latching mechanisms, including conventional 16 G and 20 G rated latches, may be used to secure first moveable wall 238 and/or second moveable wall 240.

In various embodiments, an upper latch (e.g., handle 402 and pin 406) and a lower latch (e.g., handle 412 and pin 416) may be interconnected by a mechanical linkage or electromechanical actuator. The interconnection allows the upper latch to open in response to the lower latch opening and for the lower latch to open in response to the upper latch opening.

Furthermore, in various embodiments, the latching mechanism may include an interlock that prevents the latching mechanisms from disengaging until cabin attendant seats 244 are properly stowed. In various embodiments, the interlock may further prevent cabin attendant seats 244 from opening until the latching mechanism is secure. In various embodiments, the interlock mechanism may be interior to first moveable wall 238 and/or second moveable wall 240. In various embodiments, the interlock mechanism may be exterior to first moveable wall 238 and/or second moveable wall 240 and be configured to engage cabin attendant seats 244 to prevent stowing and/or opening cabin attendant seats 244 until the latching mechanism is properly secured.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. For example, variations in the above-described embodiments may be used to accommodate various aircraft types, including, but not limited to, widebodies, narrowbodies, regional jets, turboprops, corporate aircraft, and/or future aircraft designs. Accordingly, the description is not intended to be exhaustive or to limit the principles described or illustrated herein to any precise form. Many modifications and variations are possible in light of the above teaching.

What is claimed is:

1. An aircraft lavatory, comprising:
   a standard access door providing access to the aircraft lavatory from at least one of an aisle, a cross aisle, or a passageway of an aircraft;
   a first moveable wall adjacent the standard access door, the first moveable wall having a first end and a second end and configured to move between a closed position and an open position, the first end of the first moveable wall configured to rotate about a first pivot point and into the aisle, the cross aisle, or the passageway of the aircraft; and
   a second moveable wall adjacent the first moveable wall, the second movable wall having a first end and a second end and configured to move between a closed position and an open position, the first end of the second moveable wall configured to rotate about a second pivot point opposite a rotation of the first movable wall and into a space adjacent to the aisle, the cross aisle, or the passageway of the aircraft, wherein in the closed positions the second end of the first movable wall is coupled to the second end of the second movable wall.

2. The aircraft lavatory of claim 1, wherein the first moveable wall is configured to rotate at least 45° about the first pivot point from the closed position to the open position.

3. The aircraft lavatory of claim 1, wherein the second moveable wall is configured to rotate at least 80° about the second pivot point from the closed position to the open position.

4. The aircraft lavatory of claim 1, further comprising:
   a latch configured to secure the second end of the first moveable wall to the second end of the second moveable wall when in the first moveable wall and the second moveable wall are in the closed position.

5. The aircraft lavatory of claim 1, wherein the first moveable wall includes a first portion extending in a first direction coupled to a second portion extending in a second direction orthogonal to the first direction.

6. The aircraft lavatory of claim 1, further comprising:
   a first cabin attendant seat coupled to the first moveable wall; and
   a second cabin attendant seat coupled to the second moveable wall.

7. The aircraft lavatory of claim 1, further comprising:
   a post configured to secure the standard access door in a closed position, wherein the first end of the first moveable wall is coupled to the post, the post being the first pivot point.

8. The aircraft lavatory of claim 7, further comprising:
   a first fixed wall having a first side and a second side and extending in a first direction;
   a second fixed wall having a first side and a second side, the first side of the second fixed wall coupled to the first side of the first fixed wall, the second fixed wall extending in a second direction that is orthogonal to the first direction, wherein the standard access door is coupled to the second fixed wall; and
   a third fixed wall having a first side and a second side, the first side of the third fixed wall coupled to the second side of the first fixed wall, the third fixed wall extending in the second direction, wherein the second moveable wall is coupled to the second side of the third fixed wall.

9. The aircraft lavatory of claim 1, wherein the aircraft lavatory is configured to receive a mobility device through an opening that is defined by the first moveable wall and the second moveable wall being in the open position.

10. An aircraft, comprising:
    at least one lavatory, wherein the at least one lavatory includes:
    a standard access door providing standard access to the at least one lavatory from an aisle, a cross aisle, or a passageway of the aircraft;
    a first moveable wall having a first end and a second end and configured to move between a closed position and an open position, the first end of the first moveable wall configured to rotate about a first pivot point and into the aisle, the cross aisle, or the passageway of the aircraft; and
    a second moveable wall having a first end and a second end and configured to move between a closed position and an open position, the first end of the second moveable wall configured to rotate about a second pivot point opposite a rotation of the first movable wall and into a space adjacent to the aisle, the cross aisle, or the passageway of the aircraft, wherein in the closed positions the second end of the first movable wall is coupled to the second end of the second movable wall.

11. The aircraft of claim 10, wherein the first moveable wall is configured to rotate at least 45° about the first pivot point from the closed position to the open position.

12. The aircraft of claim 10, wherein the second moveable wall is configured to rotate at least 80° about the second pivot point from the closed position to the open position.

13. The aircraft of claim 10, the at least one lavatory further comprising:
    a latch configured to secure the second end of the first moveable wall to the second end of the second moveable wall when in the first moveable wall and the second moveable wall are in the closed position.

14. The aircraft of claim 10, wherein the first moveable wall includes a first portion extending in a first direction coupled to a second portion extending in a second direction orthogonal to the first direction.

15. The aircraft of claim 10, further comprising:
    a first cabin attendant seat coupled to the first moveable wall; and
    a second cabin attendant seat coupled to the second moveable wall.

16. The aircraft of claim 10, the at least one lavatory further comprising:
    a post configured to secure the standard access door in a closed position, wherein the first end of the first moveable wall is coupled to the post, the post being the first pivot point.

17. The aircraft of claim 10, further comprising:
    a first aisle adjacent the at least one lavatory; and
    a first curtain configured to extend across the first aisle, the first curtain providing privacy for the at least one lavatory.

18. The aircraft of claim 17, further comprising:
    a second aisle adjacent the at least one lavatory; and
    a second curtain configured to extend across the second aisle, the second curtain providing privacy for the at least one lavatory.

19. The aircraft of claim 10, the at least one lavatory further comprising:
    a first fixed wall having a first side and a second side and extending in a first direction;
    a second fixed wall having a first side and a second side, the first side of the second fixed wall coupled to the first side of the first fixed wall, the second fixed wall extending in a second direction that is orthogonal to the first direction, wherein the standard access door is coupled to the second fixed wall; and a third fixed wall having a first side and a second side, the first side of the third fixed wall coupled to the second side of the first fixed wall, the third fixed wall extending in the second direction, wherein the second moveable wall is coupled to the second side of the third fixed wall.

20. The aircraft of claim 10, wherein the at least one lavatory is configured to receive a mobility device through an opening defined by the first moveable wall and the second moveable wall being in the open position.

\* \* \* \* \*